US012785306B2

(12) United States Patent
Schnell

(10) Patent No.: US 12,785,306 B2
(45) Date of Patent: Nov. 3, 2026

(54) PLUG DEVICE FOR ATTACHING ELECTRONIC COMPONENTS ON A CIRCUIT BOARD

(71) Applicant: WÜRTH ELEKTRONIK ICS GMBH & CO. KG, Niedernhall (DE)

(72) Inventor: Thomas Schnell, Heilbronn (DE)

(73) Assignee: WURTH ELEKTRONIK ICS GMBH & CO. KG, Niedernhall (DE)

( * ) Notice: Subject to any disclaimer, the term of this patent is extended or adjusted under 35 U.S.C. 154(b) by 371 days.

(21) Appl. No.: 18/549,874

(22) PCT Filed: Jan. 14, 2022

(86) PCT No.: PCT/EP2022/050703
§ 371 (c)(1),
(2) Date: Sep. 8, 2023

(87) PCT Pub. No.: WO2022/189046
PCT Pub. Date: Sep. 15, 2022

(65) Prior Publication Data

US 2024/0305022 A1 Sep. 12, 2024

(30) Foreign Application Priority Data

Mar. 9, 2021 (DE) ..................... 10 2021 105 670.5

(51) Int. Cl.

| | |
|---|---|
| ***H01R 12/70*** | (2011.01) |
| ***H01R 12/58*** | (2011.01) |
| ***H01R 12/71*** | (2011.01) |

(52) U.S. Cl.
CPC ....... *H01R 12/7076* (2013.01); *H01R 12/585* (2013.01); *H01R 12/718* (2013.01)

(58) Field of Classification Search
CPC .......... H01R 112/7076; H01R 112/585; H01R 112/718; H01R 12/7076; H01R 12/585; H01R 12/718
(Continued)

(56) References Cited

U.S. PATENT DOCUMENTS

| | | | | |
|---|---|---|---|---|
| 3,792,412 A * | 2/1974 | Madden | H01R 12/718 439/82 |
| 3,865,455 A * | 2/1975 | Berg, deceased | H01R 12/58 439/82 |

(Continued)

FOREIGN PATENT DOCUMENTS

| | | |
|---|---|---|
| CN | 106450895 A | 2/2017 |
| DE | 27 00 232 A1 | 7/1978 |

(Continued)

OTHER PUBLICATIONS

International Search Report and Written Opinion of PCT/EP2022/050703, Jun. 1, 2022, 17 pages.

(Continued)

*Primary Examiner* — Harshad C Patel
(74) *Attorney, Agent, or Firm* — Womble Bond Dickinson (US) LLP

(57) ABSTRACT

Embodiments of the present invention relate to a plug device for attaching electronic components on a circuit board. The plug device comprises a base portion which is present in a base plane, and at least two side panels which are attached to corresponding edge regions of the base portion and protrude from the base plane, wherein at at least one side panel, press-in pins for pressing in a circuit board are provided. Furthermore, the plug device comprises an attachment element which is formed at the base portion, and a (Continued)

coupling element which is attached to the attachment element, wherein the electronic component is couplable to the coupling element.

18 Claims, 8 Drawing Sheets

(58) Field of Classification Search
USPC ............................................................ 439/82
See application file for complete search history.

(56) References Cited

U.S. PATENT DOCUMENTS

| | | | | | |
|---|---|---|---|---|---|
| 4,630,882 | A * | 12/1986 | Naylor | H01R 9/24 | 439/444 |
| 5,719,753 | A * | 2/1998 | Taylor | H01R 4/32 | 361/753 |
| 5,807,120 | A * | 9/1998 | Matthews | H01R 12/58 | 439/748 |
| 7,473,111 | B2 * | 1/2009 | Konishi | H01R 12/58 | 439/82 |
| 8,075,322 | B2 * | 12/2011 | Schwettmann | H01R 11/28 | 439/82 |
| 8,864,536 | B2 * | 10/2014 | Hoffmeyer | H01R 12/58 | 439/82 |
| 8,968,010 | B2 * | 3/2015 | Endo | H01R 13/055 | 439/82 |
| 2006/0189209 | A1 * | 8/2006 | Lai | H01R 12/7064 | 439/607.01 |
| 2008/0207015 | A1 * | 8/2008 | Sueyoshi | H05K 3/325 | 439/75 |
| 2009/0181563 | A1 * | 7/2009 | Lin | H01R 12/58 | 439/78 |
| 2011/0036624 | A1 * | 2/2011 | Kagimura | H01R 12/515 | 174/260 |
| 2012/0252284 | A1 * | 10/2012 | Kato | H01R 43/205 | 439/884 |
| 2015/0229076 | A1 * | 8/2015 | Lee | H01R 12/714 | 439/82 |

FOREIGN PATENT DOCUMENTS

| | | | |
|---|---|---|---|
| DE | 10 2010 005 833 | A1 | 9/2011 |
| DE | 10 2017 124 812 | A1 | 4/2019 |
| DE | 10 2018 101 432 | A1 | 7/2019 |
| EP | 3 236 533 | A1 | 10/2017 |
| WO | WO 2009/003907 | A1 | 1/2009 |

OTHER PUBLICATIONS

German Search Report of DE 10 2021 105 670.5, Oct. 27, 2021, 10 pages.

* cited by examiner

PLUG DEVICE FOR ATTACHING ELECTRONIC COMPONENTS ON A CIRCUIT BOARD

CROSS-REFERENCE TO RELATED APPLICATIONS

This application is a national US phase of PCT/EP2022/050703 which claims the benefit of the filing date of German Patent Application No. 10 2021 105 670.5 filed 9 Mar. 2021, the disclosure of which is hereby incorporated herein by reference.

TECHNICAL FIELD

Embodiments of the present invention relate to a plug device for attaching electronic components on a circuit board. Furthermore, embodiments of the invention relate to a method for manufacturing a plug device for attaching electronic components on a circuit board.

TECHNOLOGICAL BACKGROUND

For manufacturing electric and/or electronic connections between different component parts, conduits, or the like, at circuit boards, plug connections are known which consists of a plug element and a conduit and/or a current cable and/or an electronic component which is attached to it.

To establish a proper mechanical connection between the plug element and the circuit board, it is advantageous that a plug element comprises a plurality of plug contacts which are mechanically attached in corresponding contact holes of a circuit board. Due to the limited space, only a limited number of plug contacts may be formed.

For example, a plug element is formed of a stamped sheet metal by bending side panels (German: Seitenwangen) which comprise corresponding press-in pins for the circuit board, out of a base plane. For an attachment of the electronic components, typically a coupling element, such as attachment pins, are provided. Usually, these are held by the bent-out side panels, such that, in other words, the coupling elements are carried by the side panels. For example, in manufacturing such a plug element, it is inserted in a simple bending tool and two opposing side panels are bent upwardly. Thereafter, for example a screw as a coupling element is placed between the side panels by hand. In the bending die (German: Biegegesenk), both remaining side panels are bent via the screw head (e.g. a hexagonal). Since the screw head may comprise large tolerances, it is difficult to exactly represent the box dimension (German: Kastenmaß) of the sheet metal body and its angularity.

In particular in the automated assembly of circuit boards with plug elements, it is required, that the plug elements comprise an exact position of the side panels and correspondingly a precise arrangement of the plug contacts. If the positions of the side panels slightly deviate, a pressing in the openings which are provided on the circuit board is impeded and has to be adapted via a readjustment and/or a post-shaping.

DESCRIPTION OF EMBODIMENTS OF THE INVENTION

There may be a need to provide a plug device for arranging electronic components on a circuit board, by which a simple automated attaching on a circuit board is possible.

This need is met by a plug connection for attaching electronic components on a circuit board, an electronic arrangement, and a method for attaching an electronic component on a circuit board, according to the subject-matters of the independent claims.

According to a first aspect of the present disclosure, a plug device for attaching electronic components on a circuit board is described. The plug device comprises a base portion which is present in a base plane, and at least two side panels which are attached to corresponding edge regions of the base portion and protrude from the base plane, wherein at at least one side panel, press-in pins for pressing in a circuit board are provided. Furthermore, the plug device comprises an attachment element which is formed at the base portion, and a coupling element which is attached to the attachment element, wherein the electronic component is couplable to the coupling element.

According to a further aspect of the present disclosure, an electronic arrangement is described. The electronic arrangement comprises a circuit board, an above-described plug device, and an electronic component, in particular an electronic component part (German: Bauteil), an external plug, or a cable. The electronic component is attached to the coupling element, wherein the side panels are pressed in the circuit board by the corresponding press-in pins.

According to a further aspect of the present disclosure, a method for manufacturing a plug device for attaching electronic components on a circuit board is described. According to the method, a base portion is provided, which is present in a base plane. Furthermore, at least two side panels are attached to corresponding edge regions of the base portion, such that the side panels protrude from the base plane, wherein at at least one side panel, press-in pins for pressing in a circuit board are provided. An attachment element is attached to the base portion. Furthermore, a coupling element is attached to the attachment element, wherein the electronic component is couplable to the coupling element.

The electronic component may describe an electric conductor in the following. Furthermore, the electronic component may also describe an electronic component part, such as a switching element, a transistor, or another electronic element.

The plug device may be manufactured from a stamped, sheet metal-type material. The plug device may consist of a material with a material thickness of 1 mm to 1.5 mm. In particular, the plug device may consist of a high current-capable and bendable material, such as copper, aluminum, silver, gold, or alloys, such as brass or bronze. The ohmic resistance of such a plug device or of a contact element may be in a range between 100μΩ and 200μΩ.

The plug device may be used for transferring signals and an electric current of at least approximately 5 ampere, in particular of at least approximately 10 ampere, further in particular of at least approximately 20 ampere, between a contact element (in particular between each single one of the contact elements) of the plug element and the circuit board which is attached to it. Corresponding contact elements and/or press-in pins may also be denoted as high current-capable contact elements. The contact elements and/or (press-in) pins may be pluggable with forces of 40 Newton to 250 Newton per pin, for example, such that a fix connection to the circuit board is establishable. Thus, a reliable contact with the counter contact provided on the borehole-side may be achieved and a proper handling may be realized. For example, the inventive plug element is suitable for automotive applications, such as tractors or buses, wherein, according to the disclosure, a fix mechanical attachment of the plug device with the board can be established.

The base portion of the plug device in particular describes a planar portion which, in particular entirely, is present in a base plane. For example, the base portion may comprise a 4-cornered or a polygonal perimeter and comprises corresponding edges between the corners. At each or at some of the edges, for example one of the side panels adjoins. The side panels may be attached to an edge by soldering, welding, or gluing, for example. In particular, the side panels and the base portion are integrally formed as one piece, wherein the side panels are bent out of the base plane relatively to the base portion. Alternatively, the base portion may comprise bent edges and/or a round or elliptical footprint.

At the base portion, an attachment element is formed. In particular, the attachment element abuts upon the base portion and/or is attached to the base portion. Therefore, between the base portion and the attachment element, in particular a force-transmitting coupling is provided. The attachment element may constitute a reception, such as a press-in nut (German: Einpressmutter), for the coupling element, as explained in more detail in the following. The coupling element serves for coupling to the electronic component part. Thus, at the coupling element, a conductor via a cable lug or a plug connection with an electronic component part may be provided, for example. The attachment element and the coupling element are respectively configured electrically conductive.

Hence, the attachment element as press-in nut can be attached by a pressing connection, for example. The coupling element may be configured as a threaded pin which is releasably attached to the press-in nut. At the coupling element, for example an external plug and/or a cable, etc. may be connected.

By embodiments of the present disclosure, the attachment element is coupled to the base portion, in particular for a force transmission. Thus, a force-transmitting coupling with the side panels is not necessary. In other words, the side panels do not have to be provided for carrying the attachment element together with the coupling element. Due to this reason, freedoms in the manufacture of the plug device result. The side panels may be correspondingly shaped independently from the attachment element and the base portion, and may be in particular correspondingly bent out of the base plane. This enables an exact positioning of the side panels relatively to the base portion, since the attachment element does no longer influence or even block a positioning. In conventional approaches, wherein an attachment element is carried by the side panels, the position and/or the bending angle of the side panels relative to the base portion is depending on how exactly the attachment element was manufactured. For example, if high manufacturing tolerances of the attachment element exist, it may not be possible to bend the side panels in a desired position, for example, since the attachment element blocks a corresponding bending.

Since, according to the present disclosure, the attachment element is coupled to the base portion in a force-transmitting manner, and not to the side panels, the side panels may be bent into their desired position in a simpler manner, without a deviation to a desired target position of the side panels being present due to a force-transmission to the attachment element. In particular, the side panels may be present spaced apart from the attachment element also in the bent target state, such that assembly tolerances for the attachment element may be provided and an adjustment possibility of the position of the side panels is enabled.

Due to the more precise positioning of the side panels and correspondingly of their press-in pins, the plug device can be attached to a desired position on the circuit board in a more effective way, in particular by automated fabrication methods, since the press-in pins can be adapted to the pregiven receiving bores on the circuit board.

According to an exemplary embodiment, the attachment element is attached exclusively to the base portion. Thus, a force-transmitting coupling with side panels is avoided and a corresponding influence of the attachment portion at the positioning of the side panels is prevented.

According to a further exemplary embodiment, the side panels protrude from the base plane, such that they at least partially enclose the attachment element. In other words, the attachment element is attached on the side of the base portion relative to the base plane, on which side also the side panels are bent out of the base plane. Indeed, the side panels do not comprise a force-transmission coupling with the attachment element, but the side panels can protect the attachment element against outer influences, for example lateral impacts. Furthermore, the side panels may comprise attachment flaps (German: Befestigungslaschen) which extend in parallel to the base plane in the direction of the attachment element, for example, such that a protection against falling out of the attachment element can be provided.

According to a further exemplary embodiment, the coupling element is releasably attached to the attachment element. For example, in this way, the attachment element can be attached as a press-in nut to the base portion by a pressing connection. The coupling element may be configured as a threaded pin which is releasably attached to the press-in nut. At the coupling element, for example an external plug and/or a cable, etc., may be connected.

According to a further exemplary embodiment, the coupling element is integrally formed with the attachment element. The coupling element and the attachment element may be manufactured as one material in a common manufacturing process and may be commonly attached to the base portion.

According to a further exemplary embodiment, the coupling element forms a threaded pin. At the threaded pin, for example a conductor eyelet of a conductor can be put over and can be attached by an attachment nut which can be screwed on the threaded pin.

According to a further exemplary embodiment, the attachment element is configured as a pin, in particular with a fixing groove. For example, a coupling element can be plugged on the pin which engages with a corresponding snap-fitting element in the fixing groove.

Furthermore, the coupling element may be configured as a pin, in particular with a fixing groove. For example, in this way, a corresponding plug of an electronic component can be pushed on the pin and latch in the guiding groove.

According to a further exemplary embodiment, the pin forms a central region with the fixing groove, wherein the fixing groove is delimited by an upper edge and a lower edge. The coupling element is configured as an elastically deformable clamping plug which is attached in the fixing groove, wherein the clamping plug comprises elastic clamping elements which are outwardly curved, such that a clamping connection in a socket of an electronic component is establishable.

According to a further exemplary embodiment, the attachment element is configured as a threaded nut. For example, the coupling element is configured as a threaded pin and can be releasably screwed in the threaded nut. Therefore, for example, a plurality of different coupling elements with different coupling mechanisms can be exchangeably screwed in the threaded nut as attachment element to the electronic component. Thereby, the flexibility of the plug device is increased.

According to a further exemplary embodiment, the attachment element is configured as a press-in element, for example as a press-in nut, and is pressed in a receiving opening of the base portion. For example, the attachment element may be attached in the receiving opening of a press-fitting. Thus, a high stability of an attachment element is provided.

According to a further exemplary embodiment, the attachment element is glued, welded, or soldered to the base portion.

According to a further exemplary embodiment, the coupling element protrudes through a receiving opening in the base portion. For example, a threaded nut as attachment element may be attached on a side of the base portion. From the opposing side of the base portion, a threaded pin as coupling element may be guided through the receiving opening and may be attached with the attachment element.

According to a further exemplary embodiment, the base portion and the side panels are made of a common sheet metal and the side panels are bent relatively to the base portion.

According to a further exemplary embodiment, at edge regions of the base portion, four or more side panels are attached. For example, the base portion may comprise a 4-cornered perimeter and may comprise corresponding edge regions between the corners. For example, the side panels may be attached by a soldering or gluing to an edge. In particular, the side panels and the base portion are integrally formed as one piece, wherein the side panels are bent out of the base plane relatively to the base portion.

According to a further exemplary embodiment, two or more attachment elements are attached to the base portion, which are at least partially enclosed by the at least two side panels. Thus, for example, multiple coupling elements may be coupled to the attachment elements. Correspondingly, for example multiple electronic components may be attached to the corresponding coupling elements.

According to a further exemplary embodiment, at at least one of the side panels, a further coupling element is attached. Besides the attachment of the above-described coupling element to the base portion, also further coupling elements may be attached to the side panels. Correspondingly, at the base portion and side panels, further electronic components may be attached.

According to a further exemplary embodiment, the side panels comprise an angle of 90° relative to the base portion and/or to the base plane. Since, according to the disclosure, the side panels do not comprise a substantial force-transmitting coupling, they can also assume a desired angle with respect to the base plane, such that, besides a 90° angle to the base plane, angles also comprise between 45° and 89°, or 91° and 135°.

According to a further exemplary embodiment, the side panels comprise respectively different angles relative to the front surface. Therefore, each side panel may be individually bent with respect to the other side panels, and, depending on the requirements, may comprise a desired angle relative to the base plane.

According to a further exemplary embodiment, at a side edge of the side panel, an attachment pin or an attachment opening for coupling with a corresponding attachment (i.e. a corresponding attachment pin or attachment opening) of a further side panel is formed. Furthermore, a corresponding attachment pin or an attachment opening at the base portion may be configured for coupling with a corresponding attachment of a further base portion. Thus, in the manner of a modular system, multiple plug devices may be attached to each other.

According to a further exemplary embodiment, a plug system is described which comprises an above-described plug device and a further plug device. The further plug device comprises at least one further side panel and a further base portion, wherein the further side panel is couplable to one of the side panels of the plug device, for example with a corresponding attachment pin or an attachment opening.

According to an exemplary embodiment of the method, the base portion and the side panels are formed, in particular stamped, from a common planar, in particular sheet metal-type, basis element. After stamping, the side panels and the base portion are present in the base plane. Subsequently, the side panels are bent out of the base plane, until the side panels comprise a desired angle relative to the base plane. In particular prior to the stage of bending, the attachment element is attached to the base portion. This is in particular possible according to the disclosure, since the side panels do not comprise a substantial force-transmitting coupling with the attachment element. Correspondingly, during placing and attachment of the attachment elements in the base portions, the side panels do not disturb. Correspondingly, a simple automated and more precise positioning and manufacturing of the attachment elements become possible.

It is noted, that the here described embodiments merely constitute a limited selection of possible embodiment variants of the disclosure. Thus, it is possible to combine the features of single embodiments with each other in a suitable manner, such that, by the here explicit embodiment variants, a plurality of different embodiments are to be considered as obviously disclosed for a skilled person. In particular, some embodiments of the disclosure are described with device claims and other embodiments of the disclosure are described with method claims. However, when reading this application, it is immediately clear for a skilled person, that, unless explicitly stated otherwise, additionally to a combination of features which belong to one type of inventive subject matter, also an arbitrary combination of features is possible which belong to different types of inventive subject matters.

BRIEF DESCRIPTION OF THE DRAWINGS

In the following, for a further explanation and for a better understanding of the present disclosure, embodiments are described in more detail with reference to the accompanied drawings.

DETAILED DESCRIPTION OF EXEMPLARY EMBODIMENTS

Same or similar components in different figures are provided with the same reference numbers. The illustrations in the figures are schematic.

Figure 1:
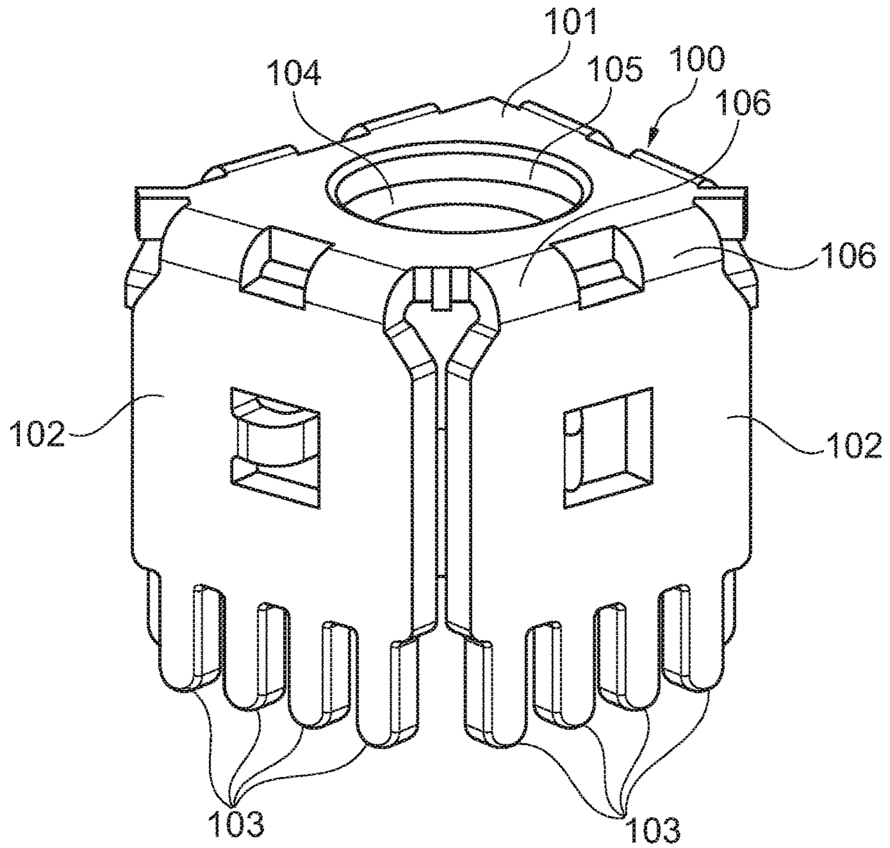
FIG. 1 shows a schematic illustration of a plug device according to an exemplary embodiment of the present disclosure.
Figure 2:
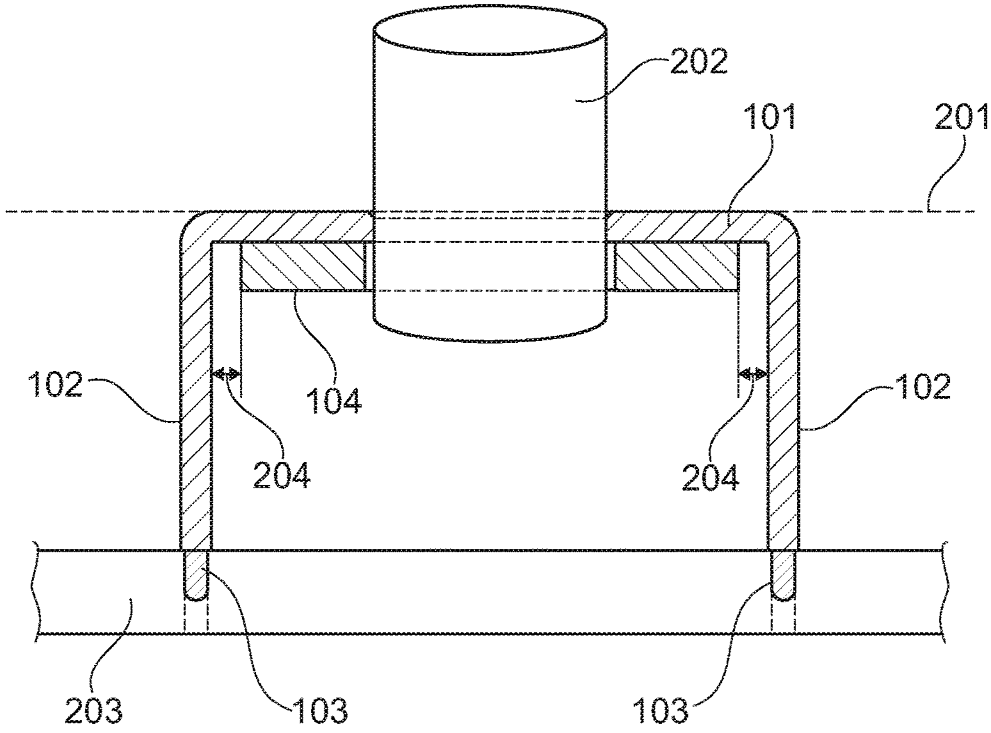
FIG. 2 shows a schematic cross-sectional illustration of a plug device according to an exemplary embodiment of the present disclosure.

FIG. 1 shows a schematic illustration of a plug device 100 according to an exemplary embodiment of the present disclosure. FIG. 2 shows a schematic cross-sectional illustration of the plug device 100 with an additional coupling element 200 for coupling an electronic component 1001 (see for example FIG. 10 and FIG. 12).

The plug device 100 comprises a base portion 101 which is present in a base plane 201, and at least two side panels 102 which are attached to corresponding edge regions of the base portion 101 and protrude from the base plane 201. At at least one side panel 102, press-in pins 103 for pressing in a circuit board 203 are provided. Furthermore, the plug device 100 comprises an attachment element 104 which is formed at the base portion 101. As illustrated in FIG. 2, a coupling element 202 is attached to the attachment element 104, wherein for example the electronic component 1001 is couplable to the coupling element.

In FIG. 2, an electronic arrangement with a circuit board 203 is shown, in which the plug device 100, by the corresponding press-in pins 103 of the side panels 102, is pressed in the circuit board 203.

The base portion 101 of the plug device 100 is a planar portion which, in particular entirely, is present in a base plane 201. As illustrated, the base portion comprises a 4-cornered perimeter, for example. At each or at some of the edges, one of the side panels 102 adjoins. The side panels 102 and the base portion 101 are integrally formed as one piece, wherein the side panels 102 are bent out of the base plane 201 relatively to the base portion 101. A side panel 102 is not connected via the entire edge of the base portion 101 with the base portion, but only in regions. For example, two spaced flaps (German: Laschen) 106 are formed which are coupled with an edge of the base portion 101 and one of the side panels 102. Thus, an easier bending of the side panels 102 out of the bending plane 201 is enabled and weight is safed.

At the base portion 101, the attachment element 104 is formed. In particular, the attachment element 104 abuts upon the base portion and/or is attached to the base portion 104. Between the base portion 101 and the attachment element 104, a force-transmitting coupling is provided. The attachment element 104 is a reception, such as a press-in nut, for the coupling element 202. The coupling element 202 serves for coupling to the electronic component 1001. The attachment element 104 and the coupling element 202 are respectively configured electrically conductive.

In the exemplary embodiments in FIG. 1 and FIG. 2, the attachment element 104 is attached as a press-in nut (see also FIG. 5, for example) to the base portion 101 by a pressing connection, for example. The coupling element 202 is configured as a threaded pin which is releasably attached to the press-in nut.

The attachment element 104 is coupled to the base portion 101 for a force transmission. Thus, a force-transmitting coupling with the side panels 102 is not necessary. Between the attachment element 103 and the side panels 102, in particular a distance 204 is present, such that the side panels 102 can be formed independently from the attachment element 103. In other words, the side panels 102 are not provided for carrying the attachment element 104 together with the coupling element 202. The side panels 102 can be more easily bend in their desired position, without a deviation to a desired target position of the side panels 102 being present due to a force-transmission to the attachment element 104. The attachment element 104 is therefore attached exclusively at the base portion 101. Thus, there is a force-transmitting coupling with the side panels 102.

The side panels 102 protrude from the base plane 201, such that they at least partially enclose the attachment element 104. In other words, the attachment element 104 is attached on the side of the base portion 101 relatively to the base plane 201, on which side also the side panels 102 are bent out of the base plane 201.

The coupling element 202 protrudes through a receiving opening 105 in the base portion. For example, a threaded nut as attachment element 104 may be attached to a side of the base portion 101. From the opposing side of the base portion 101, a threaded pin as coupling element 202 may be guided through the receiving opening 105 and may be attached by the attachment element 104.

Figure 3:
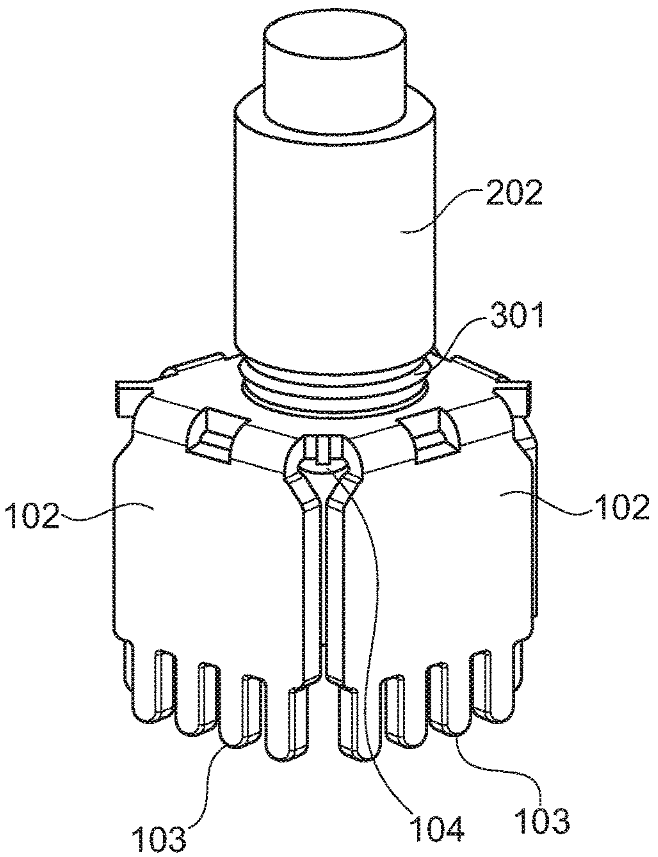
FIG. 3 shows a schematic illustration of a plug device with a pin with a fixing groove according to an exemplary embodiment of the present disclosure.

FIG. 3 shows a schematic illustration of a plug device 100 with a pin with a fixing groove according to an exemplary embodiment of the present disclosure. The coupling element 202 is configured as a pin, in particular with a fixing groove

301. Thus, for example a corresponding plug of an electronic component 1001 can be pushed on the pin and latch in the guiding groove.

Figure 4:
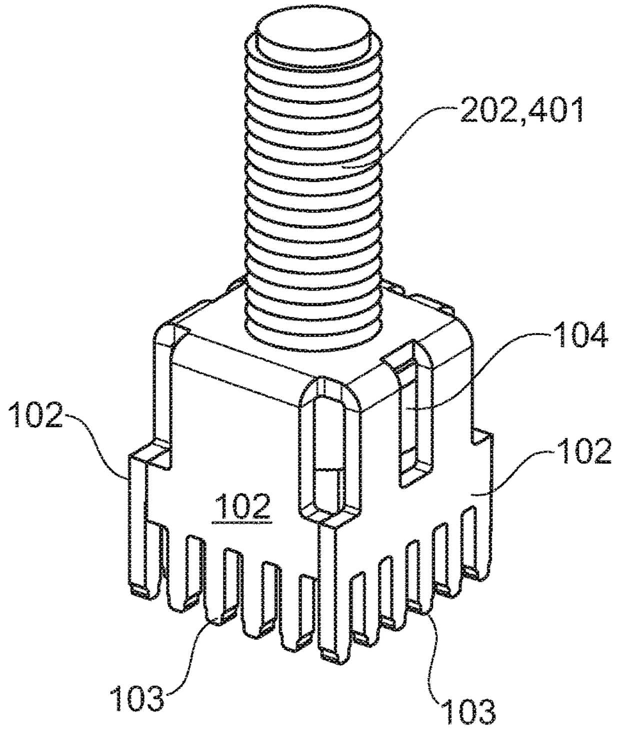
FIG. 4 shows a schematic illustration of a plug device with a threaded pin according to an exemplary embodiment of the present disclosure.

FIG. 4 shows a schematic illustration of a plug device with a threaded pin 401 as coupling element 202. For example, at the threaded pin 401, a conductor eyelet of a conductor may be put as an electronic component 1001 and may be attached by an attachment nut which may be screwed on the threaded pin 401.

Figure 5:
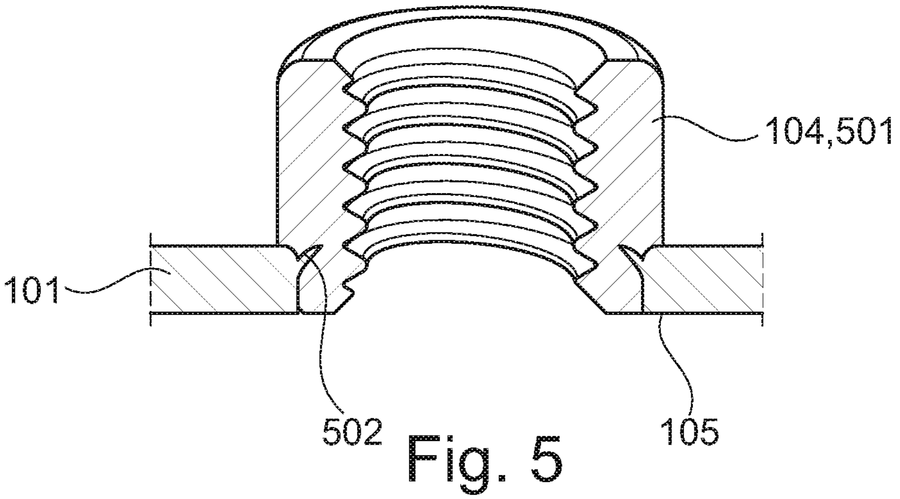
FIG. 5 shows a schematic illustration of a press-in nut of a plug device according to an exemplary embodiment of the present disclosure.

FIG. 5 shows a schematic illustration of a press-in nut (threaded nut 501) of a plug device 100 according to an exemplary embodiment of the present disclosure. The press-in nut 501 is pressed in a receiving opening 105 of the base portion 101. Additionally or alternatively, the attachment element 104 is glued, welded, or soldered, at the base portion 100. The threaded nut/press-in nut 501 and/or the press-in element comprises at the outer perimeter a surrounding indentation/groove 502. During the press-in process, material of the base portion 101 is pressed in the indentation 502 and thus a torque proof and stable attachment is generated.

Figure 6:
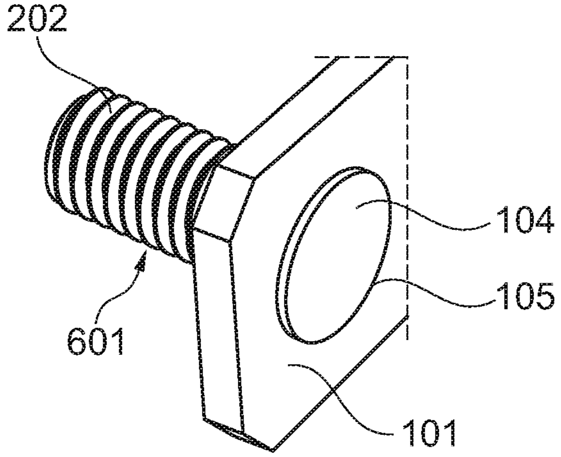
FIG. 6 shows a schematic illustration of a press-in screw of a plug device according to an exemplary embodiment of the present disclosure.

FIG. 6 shows a schematic illustration of a press-in screw 601 of a plug device 100 according to an exemplary embodiment of the present disclosure. The press-in screw 601 comprises a screw head as attachment element 104 and a threaded portion as coupling element 202. The screw head is pressed in the receiving opening 105 of the base portion 101 and is thus fixedly connected.

Figure 7:
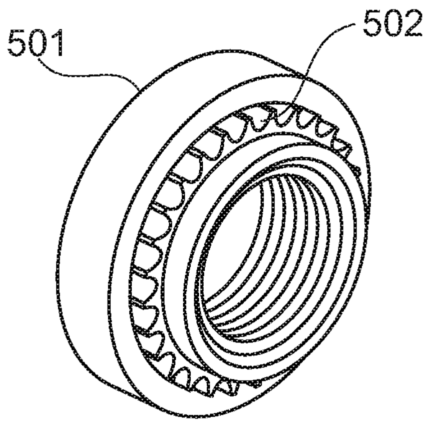
FIG. 7 shows a schematic illustration of a press-in nut according to an exemplary embodiment of the present disclosure.

FIG. 7 shows a schematic illustration of a press-in nut 501 according to an exemplary embodiment of the present disclosure. The press-in nut comprises corresponding indentations 502, in which the material of the base portion 101 may flow during pressing, to improve the attachment.

Figure 8:
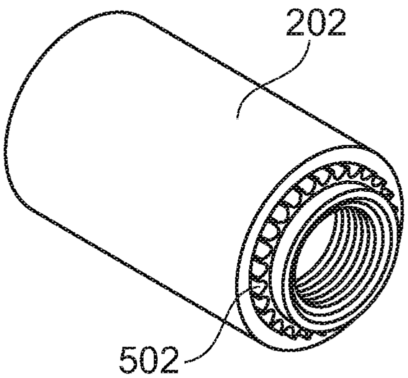
FIG. 8 shows a schematic illustration of a press-in pin according to an exemplary embodiment of the present disclosure.

FIG. 8 shows a schematic illustration of a press-in pin as coupling element 202 according to an exemplary embodiment of the present disclosure. The press-in pin also comprises indentations 502 at one end, which improve the pressing connection to the base portion 101.

Figure 9:
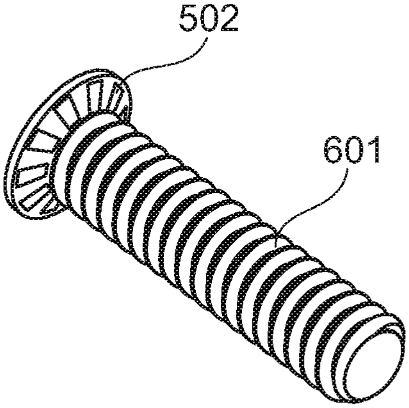
FIG. 9 shows a schematic illustration of a press-in screw according to an exemplary embodiment of the present disclosure.

FIG. 9 shows a schematic illustration of a press-in screw 601 according to an exemplary embodiment of the present disclosure. The press-in screw 601 comprises a threaded portion, to which for example a coupling element of the electronic component 1001 may be coupled. Furthermore, the press-in screw 601 comprises indentations 502 at the screw head, to provide an improved and torque proof pressing connection with the base portion 101.

Figure 10:
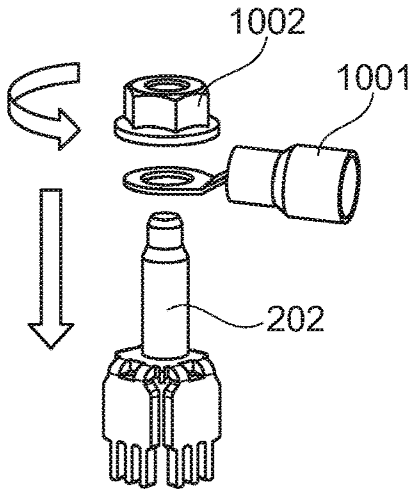
FIG. 10 and FIG. 11 show schematic illustrations of a plug device, to which a conductor as electronic component is attached, according to an exemplary embodiment of the present disclosure.
Figure 11:
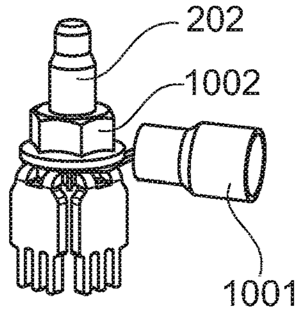

FIG. 10 and FIG. 11 show schematic illustrations of a plug device 100, to which a conductor as electronic component 1001 is attached. The coupling element 202 is configured as a pin, for example. Via the coupling element 202, an eyelet of a conductor 1001 is put. For an attachment, an attachment nut 1002 may be plugged on the coupling element 202 by a plug connection, or, if the coupling element 202 comprises a threaded portion, may be attached to the coupling element 202 by a screw connection.

Figure 12:
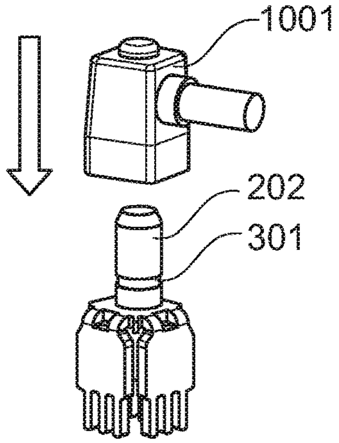
FIG. 12 and FIG. 13 show schematic illustrations of a plug device, to which a plug element as electronic component is attached, according to an exemplary embodiment of the present disclosure.
Figure 13:
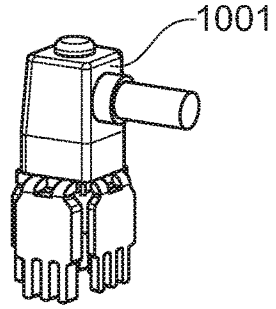

FIG. 12 and FIG. 13 show schematic illustrations of the plug device 100, to which a plug element as electronic component 1001 is attached. The electronic component 1001 may also describe an electronic component part, such as a circuit element, a transistor, or another electronic element.

Figure 14:
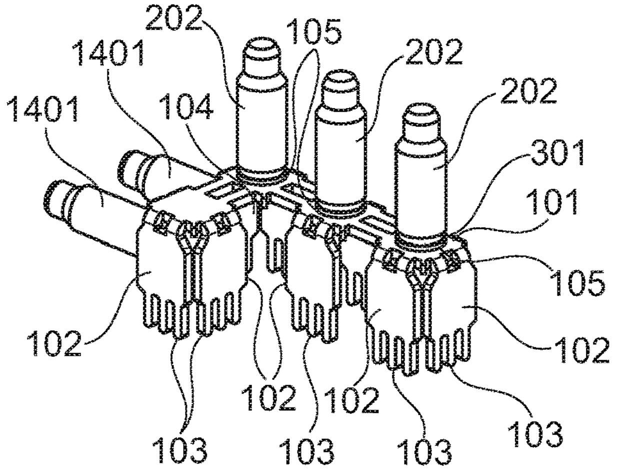
FIG. 14 shows a schematic illustration of a plug device with multiple coupling elements according to an exemplary embodiment of the present disclosure.
Figure 15:
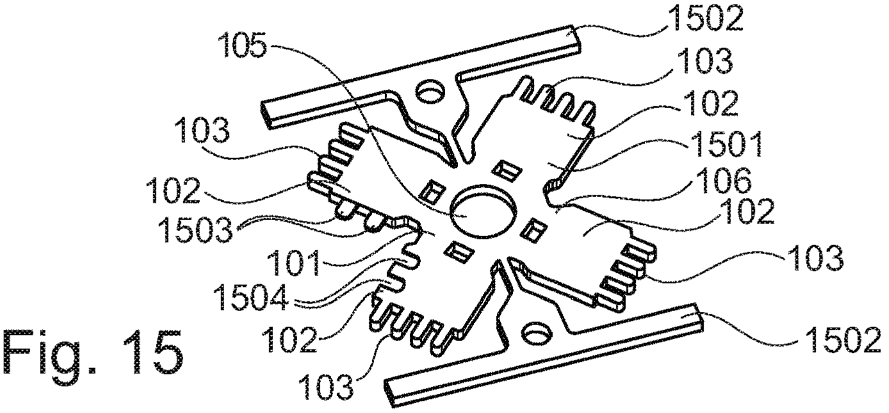
FIG. 15 to FIG. 18 show schematic illustrations of a manufacturing method for manufacturing a plug device according to an exemplary embodiment of the present disclosure.
Figure 16:
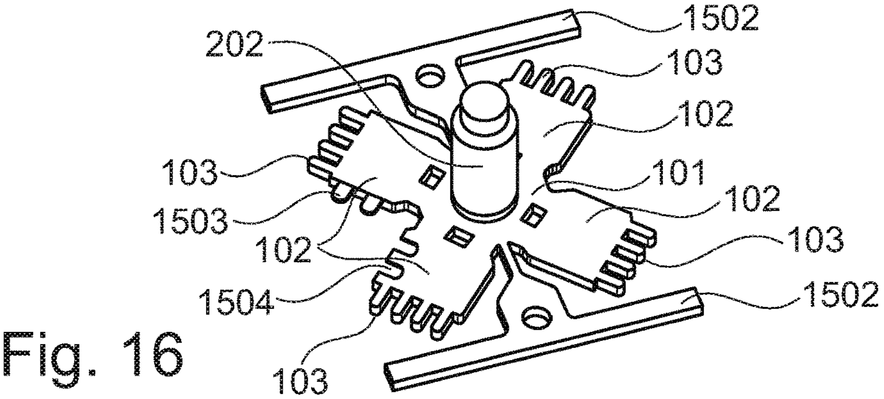

FIG. 14 shows a schematic illustration of a plug device 100 with multiple coupling elements 202 according to an exemplary embodiment of the present disclosure. At the base portion 101, which runs along the base plane 201 in a L-shaped manner, multiple attachment elements 202 are attached, which are formed pin-shaped and comprise a fixing groove 100, for example. At respectively 4-cornered portions of the base portion 101, downwardly bent side panels 102 with corresponding press-in pins 103 are provided. Below the attachment portion 101 and its receiving openings 105, corresponding attachment elements 104 are provided. The coupling elements 202 protrude through the base portion 101 and are attached to the respective attachment elements 104. The side panels 202 at least partially enclose the attachment elements 104. At the multiple coupling elements 202, multiple different electronic components 1001 may be coupled.

For example, it is further shown, that also at the side panels 102, further coupling elements 1401 may be attached, such that also laterally at the side panels 102, further electronic components 1001 may be coupled.

In this respect, it is noted, that the side panels 102 may be bent perpendicularly relatively to the base plane 201. Additionally or alternatively, also angles of the side panels 102 relative to the base plane 201 may be provided which are different from 90°. In particular, the angles of the side panels 102 relative to the base plane 201 may respectively differ.

FIG. 15 to FIG. 18 shows schematic illustrations of a manufacturing method for manufacturing a plug device 100 according to an exemplary embodiment of the present disclosure.

The base portion 101 and the side panels 102 are formed, in particular stamped, from a common planar, in particular sheet metal-type basis element 1501. After stamping, the side panels 102 and the base portion 101 are present in the base plane 201 (see FIG. 15). Subsequently, for example, the attachment element 104 is pressed in the receiving opening 105 or attached in another manner. On the attachment element 104, the coupling element 202 is subsequently attached (see FIG. 16).

Figure 17:
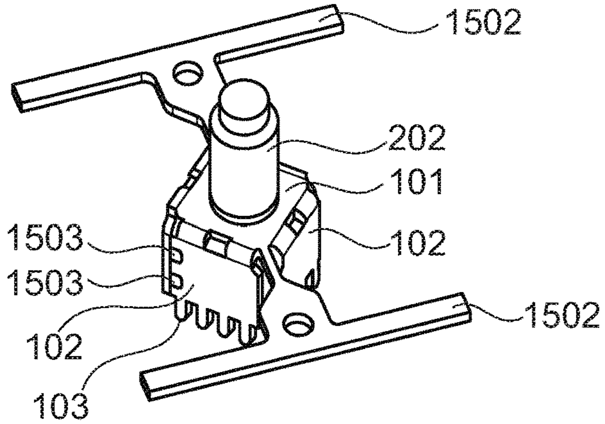
Figure 18:
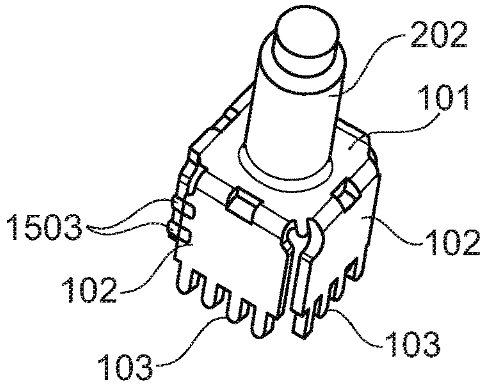

Subsequently, the side panels 102 are bent out of the base plane 201, until the side panels 101 comprise a desired angle relative to the base plane 201 (see FIG. 17). In particular, according to the disclosure, this is possible, since the side panels 102 do not comprise a substantial force-transmitting coupling with the attachment element 104.

For a better handling of the plug device 100 during the manufacture, additional handling portions 1502 are provided. The handling portions 1502 are corresponding ledges (German: Leisten), for example, which are arranged at the lateral edges and may be handled by a corresponding gripping unit. In a manner of speaking, the handling portions 1502 form a kind of transport belt. During the bending process of the side panels 102, the handling portions 1502 may be attached by a gripping unit, for example. After the bending process, the handling portions 1502 may be removed (see FIG. 18).

In summary, during the bending process of the side panels 102, also after arranging the attachment element 104, there is enough assembly space, to perform the bending process with a bending matrix/bending stamp in a precise manner. Thus, for example an exactly orthogonal box dimension is enabled, which can be adapted to the bore layout of the circuit board 203 as good as possible. The plug device 100 remains at the transport belt and/or the handling portion 1502 until the last manufacturing stage.

The sheet metal-type basis element 1501 may comprise a material thickness of 1 mm to 1.5 mm. In particular, the plug device may consist of a high current-capable and bendable material, such as copper, aluminum, silver, gold, or alloys, such as brass or bronze. The ohmic resistance of such a plug device and/or a contact element may be in a range between 100μΩ and 200μΩ.

It is further shown, that the side panels 102 may comprise protruding attachment pins 1503 at the edges, for example, which may be formed during stamping, for example. Correspondingly, neighbored lateral edges of neighbored side panels 102 may comprise corresponding attachment openings 1504, as illustrated in FIG. 17. Thus, after bending the side panels 102 upwardly, the attachment pins 1503 may be bent in the corresponding attachment openings 1502 and may be attached and/or pressed therein. Therefore, an additional lateral coupling between the side panels, such that a more stable implementation may be provided. Furthermore, the attachment pins 1503 or the attachment openings 1504 may be used to couple a further plug device 2400, as for example shown in FIG. 24.

Figure 19:
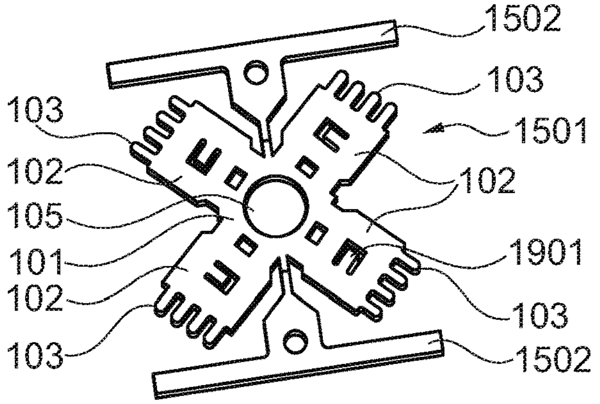
FIG. 19 to FIG. 21 show schematic illustrations of a manufacturing method for manufacturing a plug device according to an exemplary embodiment of the present disclosure.
Figure 20:
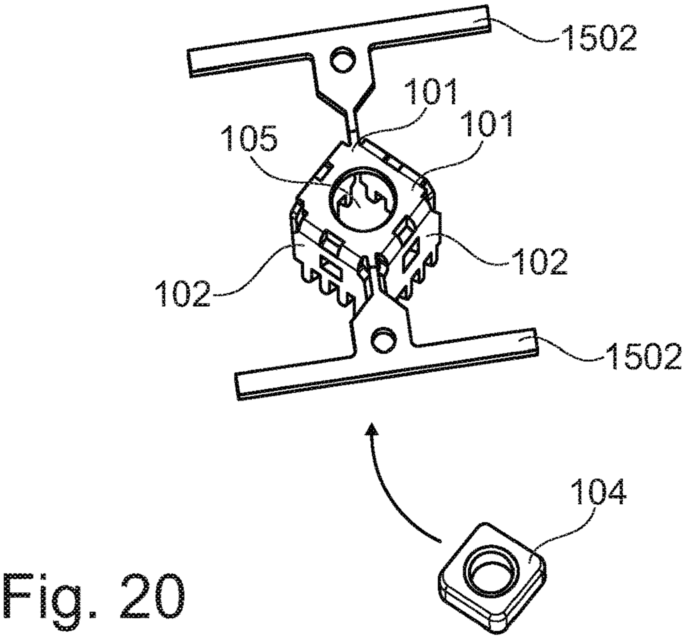
Figure 21:
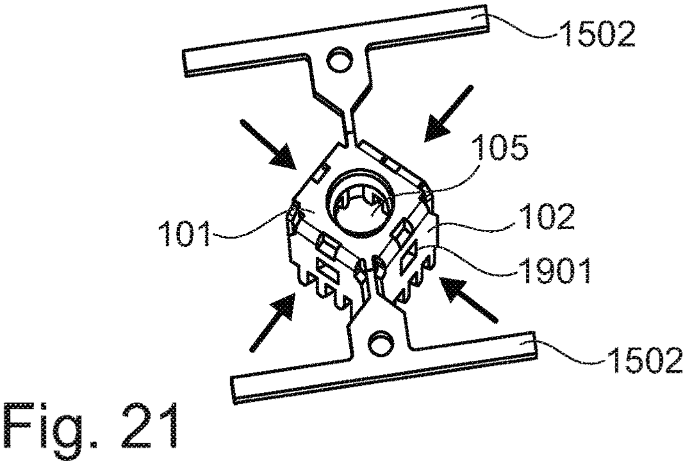

FIG. 19 to FIG. 21 show schematic illustrations of a manufacturing method for manufacturing a plug device 100, similar to the previous manufacturing method. In the manufacturing method in FIG. 19 to FIG. 21, at first the side panels 102 are bent, before an attachment element 104 is (automatically) supplied and is attached to the base portion 101. After the bending process, the attachment element 104 is attached to the base portion 101 (see FIG. 20). Subsequently, additionally, for example, securing elements (locking flaps) 1901 may be bent inwardly, to thereby prevent a falling out of the attachment element 104, in particular along a normal direction of the base plane 201. Thus, after releasing the attachment element 104 from the base portion 101, a falling out of the attachment element 104 may be prevented.

Figure 22:
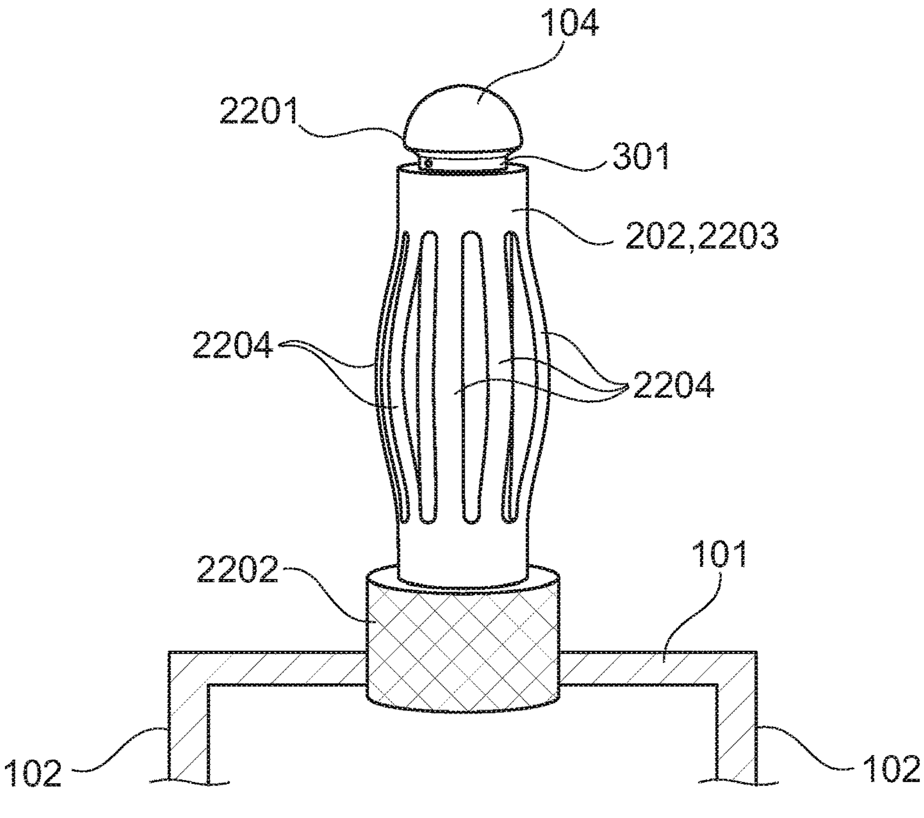
FIG. 22 shows a schematic illustration of an embodiment of the coupling element as a clamping connector.

FIG. 22 shows a schematic illustration of an embodiment of the coupling element 202 as clamping connector and/or clamping plug 2203. For example, the attachment element 104 may be configured as a pin, wherein the pin may protrude in the receiving opening of the base portion 101, and may be attached to the base portion 101 (for example by clamping). The pin comprises a central region which forms a fixing groove 301. The fixing groove 301 is delimited by an upper edge 2201 and a lower edge 2202. A clamping plug (a so-called banana plug) 2203 as coupling element 202 is fixed in the groove 301. The clamping plug 2203 may be elastically deformable, such that it may be put over the pin as attachment element 104. Alternatively, the clamping plug may be wound around the pin within the securing groove 301. The clamping plug 2203 comprises multiple elastic clamping elements 2204 which are outwardly bent and/or outwardly curved, to generate a clamping connection in a socket of an electronic component 1001.

Figure 23:
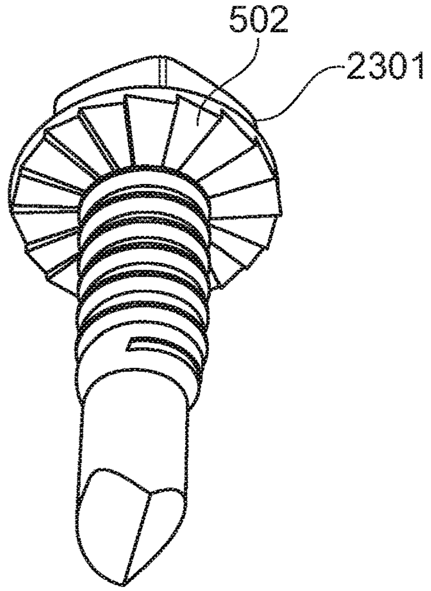
FIG. 23 shows a schematic illustration of an embodiment of the attachment element as a metal screw.

FIG. 23 shows a schematic illustration of an embodiment of the attachment element 104 as a screw, in particular as a metal screw 2301. The metal screw 2301 may be screwed through the base portion 101, for example, to therefore generate a screw connection and/or clamping with the base portion 101. At the same time, by screwing, the metal screw 2301 may protrude through the base portion 101 through the receiving opening 105 and may be screwed by screwing in an electronic component 1001 which abuts against the base portion 101, to therefore generate a screw fixing. The metal screw 2301 may further comprise corresponding indentations 502 at its screw head, which may be pushed and therefore fixed by screwing in the material of the base portion 101. By the indentations 502, an improved fixing and a rotational securing of the metal screw 2301 in the base portion 104 may thus be achieved.

Figure 24:
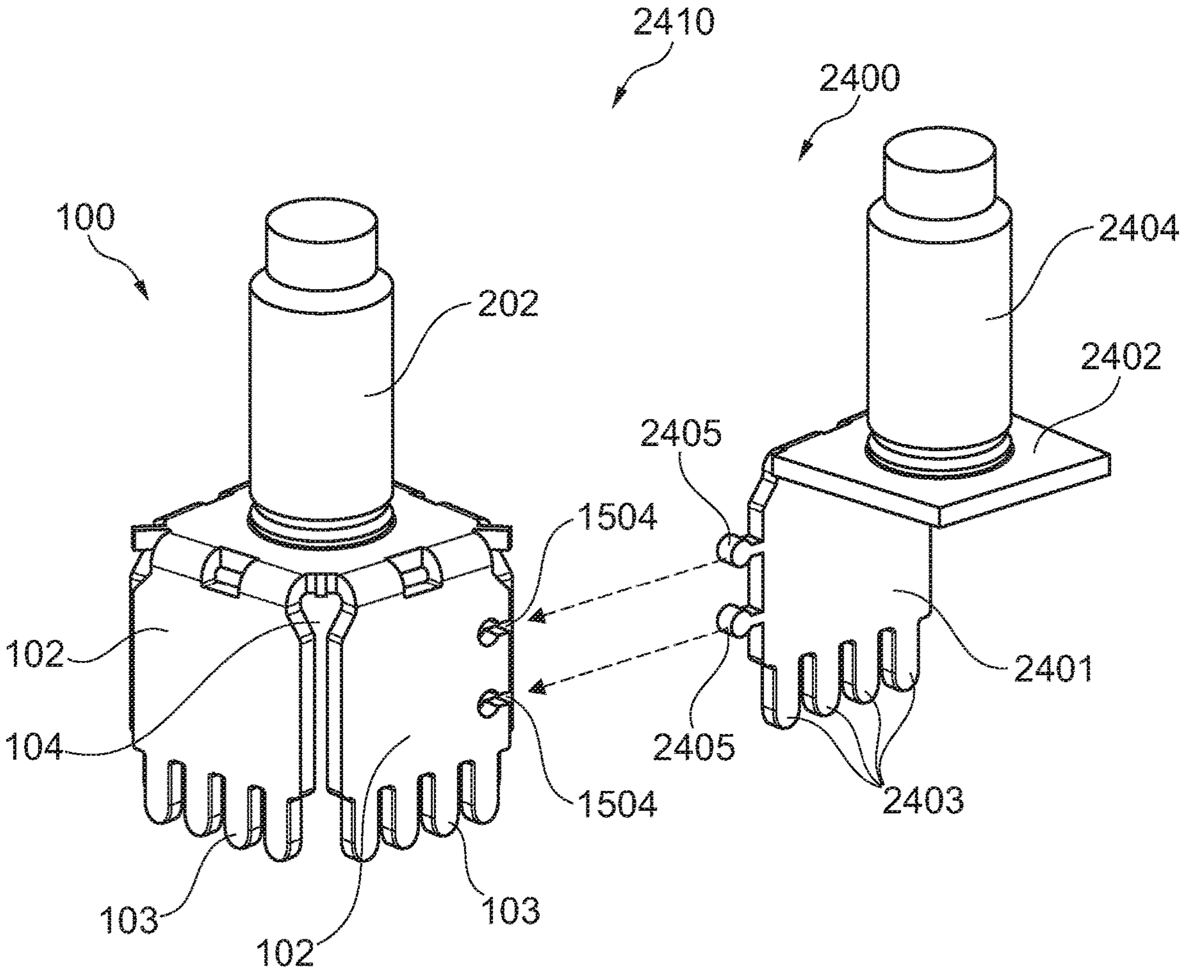
FIG. 24 shows a schematic illustration of a plug system with a plug device, to which a further plug device is couplable, according to an exemplary embodiment of the present disclosure.

FIG. 24 shows a schematic illustration of a plug system 2410 with a plug device 100, to which a further plug device 2400 is couplable. The plug system 2410 is built in the manner of a modular system, whereby to a plug device 100, one or more further plug devices 2400 may be, in particular releasably, coupled.

A side panel 102 of the plug device 100 comprises, for example at a lateral edge, for example protruding attachment pins 1503 (see FIG. 15) or attachment openings 1504 which may be formed during stamping, for example.

The further plug device 2400 comprises a further base portion 2402 which is present in a base plane 201, and at least one further side panel 2401 which is attached to a corresponding edge region of the further base portion 2402 and protrudes from the base plane which may constitute the same base plane 201 as the plug device 100. At the further side panel 2403, further press-in pins 2403 for pressing in a circuit board 203 are provided. As illustrated in FIG. 24, a further coupling element 2404 is attached to the base portion 2402, wherein for example a further electronic component 1001 is couplable to the further coupling element 2404.

The further plug device 2400 may further comprise further side panels 2401, for example four further side panels 2401 in total. Furthermore, the further plug device 2400 may be configured as the plug device 100 and may comprise a further attachment element, for example, to which the further coupling element 2404 is attached.

A further side panel 2401 comprises at a lateral edge correspondingly at least one attachment pin 2405 (or corresponding attachment openings) which may be attached, in particular impressed, in the attachment opening 1504 in a side panel 102 of the plug device 100. Thus, multiple plug devices 100, 2400, may be coupled with each other, and may be connected to each other in the manner of a modular system. The plug devices 100, 2400 may be equipped with desired coupling elements 202, 2404. Depending on the need, a plug system 2410 may be individually assembled with desired plug devices 100, 2400 and their special coupling elements 202, 2404.

Supplementary, it is to be noted, that “encompassing” does not exclude other elements or steps, and “a” or “an” does not exclude a plurality. Furthermore, it is noted, that features or steps which are described with reference to one of the above embodiments may also be used in combination with other features or steps of other above-described embodiments. Reference signs in the claims are not to be construed as limitation.

LIST OF REFERENCE SIGNS

| | |
|---|---|
| 100 | plug device |
| 101 | base portion |
| 102 | side panel |
| 103 | press-in pin |
| 104 | attachment element |
| 105 | receiving opening |
| 106 | flap |
| 201 | base plane |
| 202 | coupling element |
| 203 | circuit board |
| 204 | distance |
| 301 | fixing groove |
| 401 | threaded pin |
| 501 | press-in nut |
| 502 | indentation |
| 601 | press-in screw |
| 1001 | electronic component |
| 1401 | further coupling element |
| 1501 | sheet metal-type base element |
| 1502 | handling portion |
| 1503 | attachment pin |

-continued

| | |
|---|---|
| 1504 | attachment opening |
| 1901 | securing element |
| 2201 | upper edge |
| 2202 | lower edge |
| 2203 | clamping plug |
| 2204 | clamping element |
| 2301 | metal screw |
| 2400 | further plug device |
| 2401 | further side panel |
| 2402 | further base portion |
| 2403 | further press-in pin |
| 2404 | further coupling element |
| 2405 | further attachment pin |

The invention claimed is:

1. A plug device for attaching electronic components on a circuit board, the plug device comprising:

a base portion which is present in a base plane, at least two side panels which are attached to corresponding edge regions of the base portion and protrude from the base plane, wherein at least one side panel, press-in pins for pressing in a circuit board are provided, an attachment element which is formed at the base portion, and a coupling element which is attached to the attachment element, wherein the electronic component is couplable to the coupling element, wherein the attachment element is attached exclusively to the base portion, and wherein the attachment element is configured as a press-in element and is pressed directly in a receiving opening of the base portion for forming a press-fit connection so as to be secured against rotation and axial withdrawal.

2. The plug device according to claim 1, wherein the side panels protrude from the base plane, such that they at least partially enclose the attachment element.

3. The plug device according to claim 1, wherein the coupling element is releasably attached to the attachment element.

4. The plug device according to claim 1, wherein the coupling element is integrally formed with the attachment element.

5. The plug according to claim 1, wherein the coupling element forms a threaded pin.

6. The plug device according to claim 1, wherein the attachment element is formed as a pin.

7. The plug device according to claim 6, wherein the pin forms a central region with the fixing groove, wherein the fixing groove is delimited by an upper edge and a lower edge, wherein the coupling element is configured as an elastically deformable clamping plug which is attached in the fixing groove, wherein the clamping plug comprises elastic clamping elements which are outwardly curved, such that a clamping connection in a socket of an electronic component is establishable.

8. The plug device according to claim 1, wherein the attachment element is configured as a threaded nut.

9. The plug device according to claim 1, wherein the attachment element is glued, welded, or soldered to the base portion.

10. The plug device according to claim 1, wherein the coupling element protrudes through a receiving opening in the base portion.

11. The plug device according to claim 1, wherein the base portion and the side panels are made of a common sheet metal and the side panels are bent relatively to the base portion.

12. The plug device according to claim 1, comprising at least one of the following features:

wherein at edge regions of the base portion, four or more side panels are attached;

wherein at the base portion, two or more attachment elements are attached, which are at least partially enclosed by the at least two side panels;

wherein at at least one of the side panels, a further coupling element is attached.

13. The plug device according to claim 1, wherein the side panels comprise an angle of 90° relative to the base portion.

14. The plug device according to claim 1, wherein the side panels respectively comprise different angles relative to the base portion.

15. The plug device according to claim 1, wherein at a side edge of the side panel, an attachment pin or an attachment opening for coupling with a corresponding attachment of a further side panel is formed.

16. An electronic arrangement comprising:

a circuit board, a plug device according to claim 1, and an electronic component which is attached to the coupling element, wherein the side panels are pressed in the circuit board by the corresponding press-in pins.

17. A method for manufacturing a plug device for attaching electronic components on a circuit board, the method comprising:

providing a base portion which is present in a base plane, attaching at least two side panels to corresponding edge regions of the base portion, such that the side panels protrude from the base plane, wherein at least one side panel, press-in pins for pressing in a circuit board are provided, attaching an attachment element at the base portion, and attaching a coupling element to the attachment element, wherein the electronic component is couplable to the coupling element, wherein the attachment element is attached exclusively to the base portion, and wherein the attachment element is configured as a press-in element and is pressed directly in a receiving opening of the base portion for forming a press-fit connection so as to be secured against rotation and axial withdrawal.

18. The method according to claim 17, wherein the base portion and the side panels are formed from a common planar basis element, wherein the side panels are bent out of the base plane, wherein the attachment element is attached to the base portion.

* * * * *